US012687800B2

(12) United States Patent
Tsuchiya

(10) Patent No.: US 12,687,800 B2
(45) Date of Patent: Jul. 21, 2026

(54) MAGNET INCLUDING A NON-ROTATABLE SHAFT ENGAGED WITH A THROUGH HOLE AT A LATERAL END

(71) Applicant: Yuuki Tsuchiya, Kanagawa (JP)

(72) Inventor: Yuuki Tsuchiya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 19/044,947

(22) Filed: Feb. 4, 2025

(65) Prior Publication Data

US 2025/0291276 A1 Sep. 18, 2025

(30) Foreign Application Priority Data

Mar. 15, 2024 (JP) ................................ 2024-041527

(51) Int. Cl.
*G03G 15/08* (2006.01)
*G03G 15/01* (2006.01)
*G03G 15/09* (2006.01)
*G03G 21/18* (2006.01)

(52) U.S. Cl.
CPC ..... *G03G 15/0882* (2013.01); *G03G 15/0121* (2013.01); *G03G 15/0881* (2013.01); *G03G 15/0891* (2013.01); *G03G 15/0893* (2013.01); *G03G 15/0896* (2013.01); *G03G 15/09* (2013.01); *G03G 15/0921* (2013.01); *G03G 21/1814* (2013.01); *G03G 21/1857* (2013.01)

(58) Field of Classification Search
CPC ........... G03G 15/0882; G03G 15/0893; G03G 15/09; G03G 15/0121; G03G 15/0881; G03G 15/0891; G03G 15/0896; G03G 15/0921; G03G 21/1814; G03G 21/1857
See application file for complete search history.

(56) References Cited

U.S. PATENT DOCUMENTS 11,029,640 B1 * 6/2021 Komatsu ............ G03G 15/0891
2003/0228171 A1 * 12/2003 Miyabe ............. G03G 21/1814 399/284
2007/0025755 A1 * 2/2007 Ishikawa ................ G03G 21/08 399/98

(Continued)

FOREIGN PATENT DOCUMENTS

JP 2007-298828 A 11/2007

*Primary Examiner* — Joseph S Wong
(74) *Attorney, Agent, or Firm* — IPUSA, PLLC

(57) ABSTRACT

A developing device contains a developer and includes a developing roller that bears the developer and a developer supplying rotator that is disposed opposite the developing roller. The developer supplying rotator rotates in a predetermined direction to supply the developer onto the developing roller. A compartment accommodates the developer supplying rotator. A first developing side plate supports the developing roller rotatably. A second developing side plate supports the developer supplying rotator rotatably. A sheet member separates the developing roller from the developer supplying rotator. The sheet member forms an enclosed space that contains the developer in the compartment. The sheet member is removed from the developing device. The first developing side plate has a sheet opening that is disposed opposite the second developing side plate. A part of the sheet member protrudes toward an outside of the developing device through the sheet opening.

17 Claims, 7 Drawing Sheets

(56) References Cited

U.S. PATENT DOCUMENTS

| | | | |
|---|---|---|---|
| 2007/0280725 | A1 | 12/2007 | Hosokawa et al. |
| 2017/0293257 | A1 | 10/2017 | Ohhira et al. |
| 2018/0143568 | A1 | 5/2018 | Ohhira et al. |
| 2020/0103824 | A1 | 4/2020 | Oshikawa et al. |
| 2020/0174400 | A1 | 6/2020 | Kawashima et al. |
| 2021/0080856 | A1 | 3/2021 | Hashikawa et al. |
| 2021/0397122 | A1* | 12/2021 | Fukui ................. G03G 21/1814 |
| 2022/0397841 | A1 | 12/2022 | Tsuchiya et al. |

* cited by examiner

MAGNET INCLUDING A NON-ROTATABLE SHAFT ENGAGED WITH A THROUGH HOLE AT A LATERAL END

CROSS-REFERENCE TO RELATED APPLICATION

This patent application is based on and claims priority pursuant to 35 U.S.C. § 119(a) to Japanese Patent Application No. 2024-041527, filed on Mar. 15, 2024, in the Japan Patent Office, the entire disclosure of which is hereby incorporated by reference herein.

BACKGROUND

Technical Field

Embodiments of this disclosure relate to a developing device, a process cartridge, and an image forming apparatus, and more particularly, to a developing device for developing a latent image formed on an image bearer such as a photoconductive drum, a process cartridge incorporating the developing device, and an image forming apparatus incorporating the developing device.

Related Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data by electrophotography.

Such image forming apparatuses include a developing device that is removably installed in the image forming apparatus. In order to prevent a developer, that prefills the developing device (e.g., a new developing device) before the developing device is dispatched from a factory, from leaking to an outside of the developing device while the developing device is transported, a sheet member (e.g., a seal) isolates a developer compartment that contains the developer from the outside of the developing device as an enclosed space. The sheet member is removable from the developing device.

SUMMARY

This specification describes below an improved developing device. In one embodiment, the developing device contains a developer and includes a developing roller that bears the developer and a developer supplying rotator that is disposed opposite the developing roller. The developer supplying rotator rotates in a predetermined direction to supply the developer onto the developing roller. A compartment accommodates the developer supplying rotator. A first developing side plate supports the developing roller rotatably. A second developing side plate supports the developer supplying rotator rotatably. A sheet member separates the developing roller from the developer supplying rotator. The sheet member forms an enclosed space that contains the developer in the compartment. The sheet member is removed from the developing device. The first developing side plate has a sheet opening that is disposed opposite the second developing side plate. A part of the sheet member protrudes toward an outside of the developing device through the sheet opening.

This specification further describes an improved process cartridge. In one embodiment, the process cartridge includes an image bearer that bears a latent image and the developing device described above that is combined with the image bearer into a unit.

This specification further describes an improved image forming apparatus. In one embodiment, the image forming apparatus includes an image bearer that bears a latent image and a developing device to be removed from the image forming apparatus. The developing device contains a developer and includes a developing roller that develops the latent image formed on the image bearer with the developer. A developer supplying rotator is disposed opposite the developing roller. The developer supplying rotator rotates in a predetermined direction to supply the developer onto the developing roller. A compartment accommodates the developer supplying rotator. A first developing side plate supports the developing roller rotatably. A second developing side plate supports the developer supplying rotator rotatably. A sheet member separates the developing roller from the developer supplying rotator. The sheet member forms an enclosed space that contains the developer in the compartment. The sheet member is removed from the developing device. The first developing side plate has a sheet opening that is disposed opposite the second developing side plate. A part of the sheet member protrudes toward an outside of the developing device through the sheet opening.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
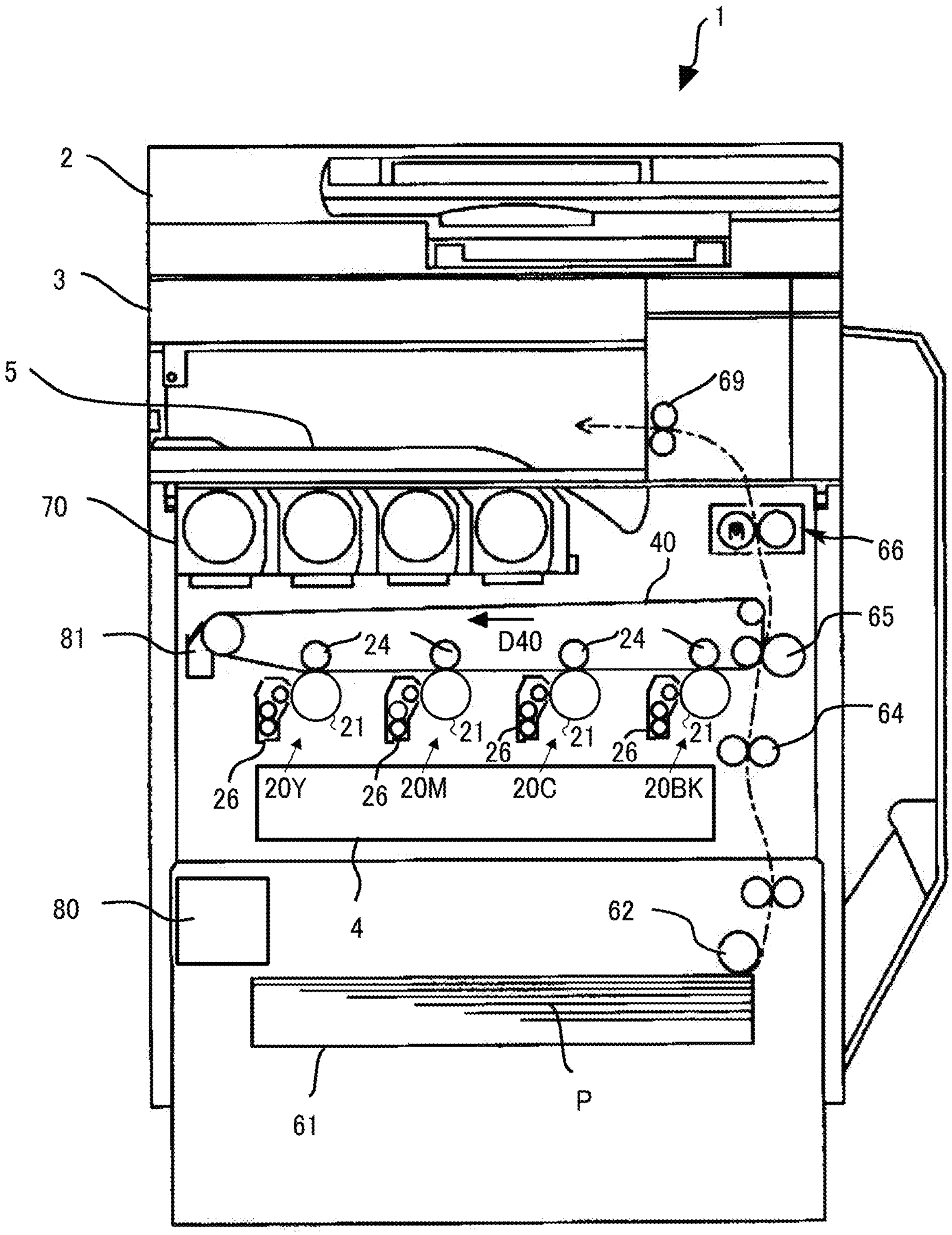
FIG. 1 is a cross-sectional view of an image forming apparatus according to an embodiment of the present disclosure, illustrating an entire construction of the image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Referring to drawings, a detailed description is provided of embodiments of the present disclosure. In the drawings, identical reference numerals are assigned to identical elements and equivalents and redundant descriptions of the identical elements and the equivalents are summarized or omitted properly.

Referring to FIG. 1, a description is provided of an entire construction and operation of an image forming apparatus 1 according to an embodiment of the present disclosure.

Figure 2:
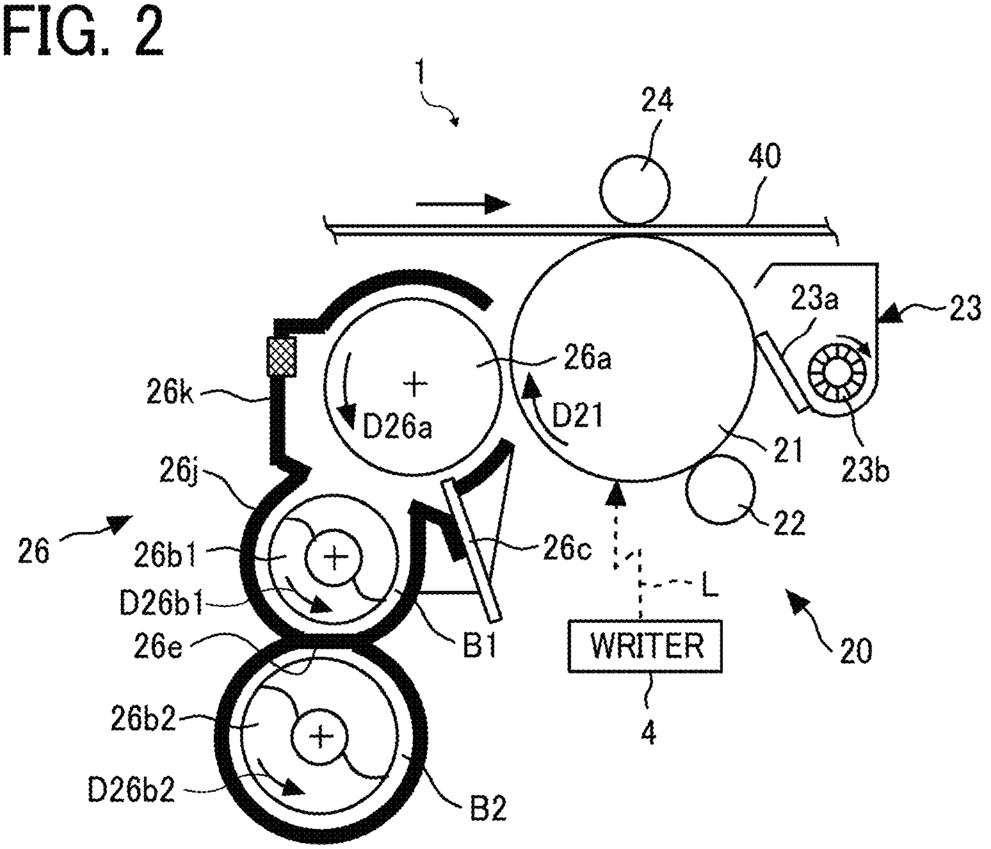
FIG. 2 is a cross-sectional view of an image forming device incorporated in the image forming apparatus depicted in FIG. 1.

The image forming apparatus 1 according to the embodiment is a tandem color image forming apparatus that includes an intermediate transfer belt 40 and a plurality of process cartridges 20Y, 20M, 20C, and 20BK that is disposed opposite and arranged along the intermediate transfer belt 40. The process cartridges 20Y, 20M, 20C, and 20BK include photoconductive drums 21, respectively. The image forming apparatus 1 further includes developing devices 26 that are disposed opposite the photoconductive drums 21, respectively, as illustrated in FIGS. 1 and 2.

FIG. 1 illustrates the image forming apparatus 1 as an apparatus body of a color copier. The image forming apparatus 1 further includes an original feeder 2, an original reader 3, and a writer 4. The original feeder 2 conveys an original to the original reader 3. The original reader 3 reads an image on the original into image data. The writer 4 (e.g., an exposure device) emits a laser beam according to the image data input thereto from the original reader 3.

The process cartridges 20Y, 20M, 20C, and 20BK are used for forming yellow, magenta, cyan, and black toner images, respectively. The intermediate transfer belt 40 bears the yellow, magenta, cyan, and black toner images as toner images in a plurality of colors, that are transferred and superimposed on the intermediate transfer belt 40 to form a full color toner image.

The image forming apparatus 1 further includes a sheet feeder 61, a secondary transfer roller 65, and a fixing device 66. The sheet feeder 61 loads sheets P such as paper. The secondary transfer roller 65 transfers the full color toner image formed on the intermediate transfer belt 40 onto a sheet P. The fixing device 66 fixes the full color toner image as an unfixed toner image on the sheet P.

The image forming apparatus 1 further includes toner containers 70, cleaners 23 depicted in FIG. 2, an intermediate transfer belt cleaner 81, and a waste-toner container 80. The toner containers 70 supply yellow, magenta, cyan, and black toners to the developing devices 26 disposed opposite the process cartridges 20Y, 20M, 20C, and 20BK, respectively. The waste-toner container 80 collects waste toner, that is, toner failed to be transferred onto the intermediate transfer belt 40 and the sheet P and collected by the cleaners 23 and the intermediate transfer belt cleaner 81, respectively.

FIG. 2 illustrates a process cartridge 20 that represents each of the process cartridges 20Y, 20M, 20C, and 20BK. The process cartridge 20 includes the photoconductive drum 21 serving as an image bearer, a charger 22, and the cleaner 23 that are combined into a unit. When each of the process cartridges 20Y, 20M, 20C, and 20BK reaches the end of lifespan thereof, each of the process cartridges 20Y, 20M, 20C, and 20BK is removed from the image forming apparatus 1 and replaced with a new one.

The developing devices 26 are disposed opposite the photoconductive drums 21 of the process cartridges 20Y, 20M, 20C, and 20BK, respectively. When each of the developing devices 26 reaches the end of lifespan thereof, each of the developing devices 26 is removed from the image forming apparatus 1 and replaced with a new one. A user performs removal and installation of the developing device 26 and removal and installation of each of the process cartridges 20Y, 20M, 20C, and 20BK separately with respect to the image forming apparatus 1.

The yellow, magenta, cyan, and black toner images are formed on the photoconductive drums 21 serving as the image bearers of the process cartridges 20Y, 20M, 20C, and 20BK, respectively.

A description is provided of normal image forming processes for forming a full color toner image, that are performed by the image forming apparatus 1.

The original feeder 2 includes a conveyance roller and an original tray. The original reader 3 includes an exposure glass. The conveyance roller conveys an original placed on the original tray to the original reader 3 so that the original is placed on the exposure glass. The original reader 3 optically reads an image on the original placed on the exposure glass into yellow, magenta, cyan, and black image data.

The yellow, magenta, cyan, and black image data are sent to the writer 4. The writer 4 emits laser beams L (e.g., exposure light) depicted in FIG. 2 onto surfaces of the photoconductive drums 21 of the process cartridges 20Y, 20M, 20C, and 20BK according to the yellow, magenta, cyan, and black image data, respectively.

On the other hand, the four photoconductive drums 21 rotate clockwise in FIGS. 1 and 2 in a rotation direction D21. The chargers 22 (e.g., charging rollers) uniformly charge the surfaces of the photoconductive drums 21 at charging positions where the photoconductive drums 21 are disposed opposite the chargers 22, respectively, in a charging process. Thus, a charging electric potential is formed on each of the photoconductive drums 21. Thereafter, a charged portion on the surface of each of the photoconductive drums 21 reaches an irradiation position where the writer 4 irradiates each of the photoconductive drums 21 with the laser beam L. Thus, electrostatic latent images are formed on the surfaces of the photoconductive drums 21 according to the yellow, magenta, cyan, and black image data at the irradiation positions, respectively, in an exposure process.

The laser beam L corresponding to a yellow component irradiates the surface of the photoconductive drum 21 of the leftmost process cartridge 20Y in FIG. 1. The writer 4 includes a polygon mirror. The polygon mirror rotating at high speed directs the laser beam L corresponding to the yellow component to scan the photoconductive drum 21 in an axial direction thereof, that is, a main scanning direction. Thus, an electrostatic latent image corresponding to the yellow component is formed on the photoconductive drum 21 charged by the charger 22.

Similarly, the laser beam L corresponding to a magenta component irradiates the surface of the photoconductive drum 21 of the second process cartridge 20M from the left in FIG. 1, forming an electrostatic latent image corresponding to the magenta component. The laser beam L corresponding to a cyan component irradiates the surface of the photoconductive drum 21 of the third process cartridge 20C from the left in FIG. 1, forming an electrostatic latent image corresponding to the cyan component. The laser beam L corresponding to a black component irradiates the surface of the photoconductive drum 21 of the fourth process cartridge 20BK from the left in FIG. 1, forming an electrostatic latent image corresponding to the black component.

Thereafter, electrostatic latent image bearing portions on the surfaces of the photoconductive drums 21, that bear the electrostatic latent images, reach developing positions where the photoconductive drums 21 are disposed opposite the developing devices 26, respectively. The developing devices 26 supply yellow, magenta, cyan, and black toners onto the photoconductive drums 21, respectively, developing the electrostatic latent images formed on the surfaces of the photoconductive drums 21 into yellow, magenta, cyan, and black toner images in a developing process.

Thereafter, the yellow, magenta, cyan, and black toner images formed on the surfaces of the photoconductive drums 21, respectively, reach primary transfer positions where the photoconductive drums 21 are disposed opposite the intermediate transfer belt 40. The image forming apparatus 1 further includes primary transfer rollers 24 that contact an inner circumferential surface of the intermediate transfer belt 40 at the primary transfer positions where the primary transfer rollers 24 are disposed opposite the photoconductive drums 21, respectively, via the intermediate transfer belt 40. At the primary transfer positions, the primary transfer rollers 24 transfer the yellow, magenta, cyan, and black toner images formed on the photoconductive drums 21, respectively, onto the intermediate transfer belt 40 successively such that the yellow, magenta, cyan, and black toner images are superimposed on the intermediate transfer belt 40 in a primary transfer process, thus forming a full color toner image on the intermediate transfer belt 40.

After the primary transfer process, transferred portions on the surfaces of the photoconductive drums 21, from which the yellow, magenta, cyan, and black toner images are transferred, reach cleaning positions where the photoconductive drums 21 are disposed opposite the cleaners 23, respectively. The cleaners 23 collect residual toner failed to be transferred onto the intermediate transfer belt 40 and therefore remaining on the photoconductive drums 21, respectively, in a cleaning process. The residual toner collected by the cleaners 23 is conveyed through a waste-toner conveyance path and collected into the waste-toner container 80.

Thereafter, dischargers disposed opposite the photoconductive drums 21, respectively, discharge a residual potential on the surfaces of the photoconductive drums 21. Thus, a series of image forming processes performed on the photoconductive drums 21 finishes.

On the other hand, an image bearing portion on a surface of the intermediate transfer belt 40, that is transferred and superimposed with the yellow, magenta, cyan, and black toner images from the photoconductive drums 21, respectively, moves in a rotation direction D40 of the intermediate transfer belt 40 depicted in FIG. 1 and reaches a secondary transfer position where the secondary transfer roller 65 is disposed opposite the intermediate transfer belt 40. At the secondary transfer position, the secondary transfer roller 65 secondarily transfers the full color toner image formed on the intermediate transfer belt 40 onto a sheet P in a secondary transfer process.

Thereafter, a transferred portion on the surface of the intermediate transfer belt 40, from which the full color toner image is transferred, reaches a cleaning position where the intermediate transfer belt 40 is disposed opposite the intermediate transfer belt cleaner 81. The intermediate transfer belt cleaner 81 collects residual toner failed to be transferred onto the sheet P and therefore remaining on the intermediate transfer belt 40, thus finishing a series of transfer processes performed on the intermediate transfer belt 40.

The residual toner collected by the intermediate transfer belt cleaner 81 is conveyed through a waste-toner conveyance path and collected into the waste-toner container 80.

The image forming apparatus 1 further includes a registration roller pair 64 and a feed roller 62. The sheet P conveyed to the secondary transfer roller 65 is conveyed from the sheet feeder 61 through the registration roller pair 64 and the like.

Specifically, the feed roller 62 feeds a sheet P from the sheet feeder 61 that loads a plurality of sheets P toward the registration roller pair 64 through a conveyance path. As the sheet P reaches the registration roller pair 64, the registration roller pair 64 conveys the sheet P to the secondary transfer roller 65 at a time when the full color toner image formed on the intermediate transfer belt 40 reaches the secondary transfer roller 65.

Thereafter, the sheet P transferred with the full color toner image is conveyed to the fixing device 66. The fixing device 66 includes a fixing roller and a pressure roller that form a fixing nip. The fixing roller and the pressure roller fix the full color toner image on the sheet P in a fixing process.

The image forming apparatus 1 further includes an output roller pair 69 and an output tray 5. After the fixing process, the output roller pair 69 ejects the sheet P onto an outside of the apparatus body of the image forming apparatus 1 as an output image. Thereafter, the sheet P is stacked on the output tray 5. Thus, a series of image forming processes (e.g., printing processes) finishes.

Figure 3:
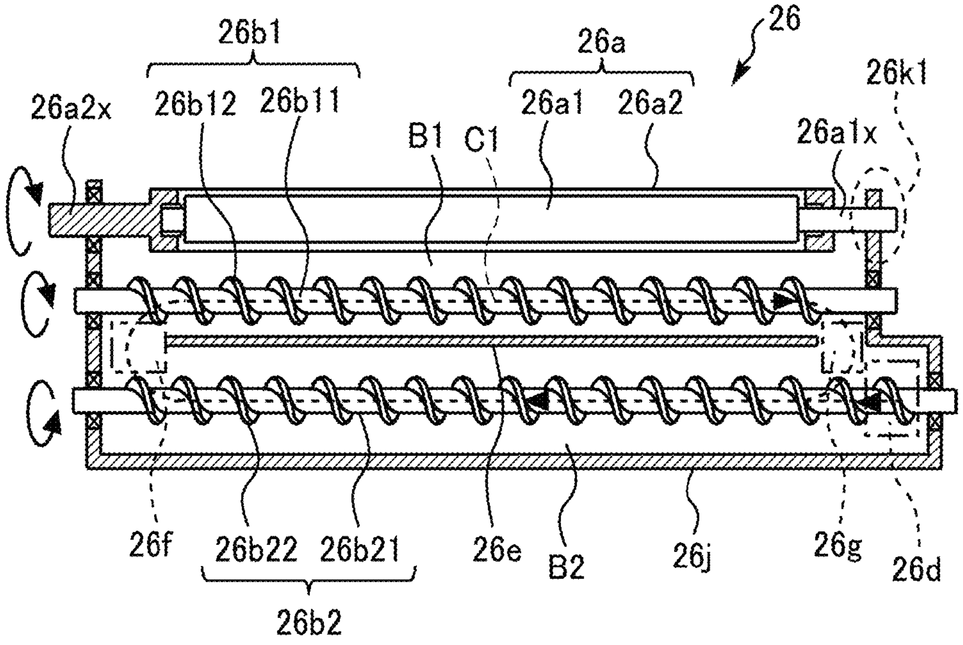
FIG. 3 is a diagram of a developing device incorporated in the image forming apparatus depicted in FIG. 1, illustrating the developing device in a longitudinal direction thereof.

Referring to FIGS. 2 and 3, a description is provided of a construction of image forming devices of the image forming apparatus 1.

The image forming apparatus 1 includes four image forming devices that use toners in different colors, respectively, in the image forming processes and have a substantially identical construction. Hence, alphabetical suffixes (e.g., Y, M, C, and BK) used in the reference numerals of components such as a process cartridge and a developing device are omitted.

As illustrated in FIG. 2, the process cartridge 20 mainly includes the photoconductive drum 21 serving as the image bearer, the charger 22, and the cleaner 23 that are combined into a unit and housed in a case.

The photoconductive drum 21 is an organic photoconductor that is negatively charged. The photoconductive drum 21 includes a drum-shaped conductive support and a photoconductive layer mounted on the conductive support.

The charger 22 is a charging roller that includes a conductive core metal and an elastic layer that has medium resistance and coats an outer circumference of the conductive core metal. As a power supply applies a predetermined voltage to the charger 22 (e.g., the charging roller), the charger 22 uniformly charges the surface of the photoconductive drum 21 disposed opposite the charger 22.

The cleaner 23 includes a cleaning blade 23*a* and a cleaning roller 23*b*. The cleaning blade 23*a* contacts the photoconductive drum 21. The cleaning blade 23*a* is made of a rubber material such as urethane rubber. The cleaning blade 23*a* contacts the surface of the photoconductive drum 21 at a predetermined angle with predetermined pressure. The cleaning roller 23*b* is a brush roller that includes a core metal and a brush mounted on an outer circumference of the core metal.

As illustrated in FIGS. 2 and 3, the developing device 26 mainly includes a developing roller 26*a*, a first conveying screw 26*b*1, a second conveying screw 26*b*2, a partition 26*e*, and a doctor blade 26*c*. The developing roller 26*a* serves as a developer bearer. The first conveying screw 26*b*1 (e.g., a conveying screw) serves as a developer supplying rotator that is disposed opposite the developing roller 26*a*. The second conveying screw 26*b*2 is disposed opposite and below the first conveying screw 26*b*1 via the partition 26*e*. The doctor blade 26*c* is disposed opposite and below the developing roller 26*a*. The doctor blade 26*c* serves as a developer regulator that regulates an amount of a developer borne on the developing roller 26*a*.

The developing device 26 contains a developer that includes carriers (e.g., carrier particles) and toner (e.g., toner particles). The developer is a two-component developer and includes an additive.

According to the embodiments, a toner particle has an average particle size of approximately 5.2 μm. A carrier particle has an average particle size of approximately 35 μm. The developer has a toner density of approximately 7 weight percent. The developing device 26 contains the developer in an amount of approximately 250 g.

Figure 4:
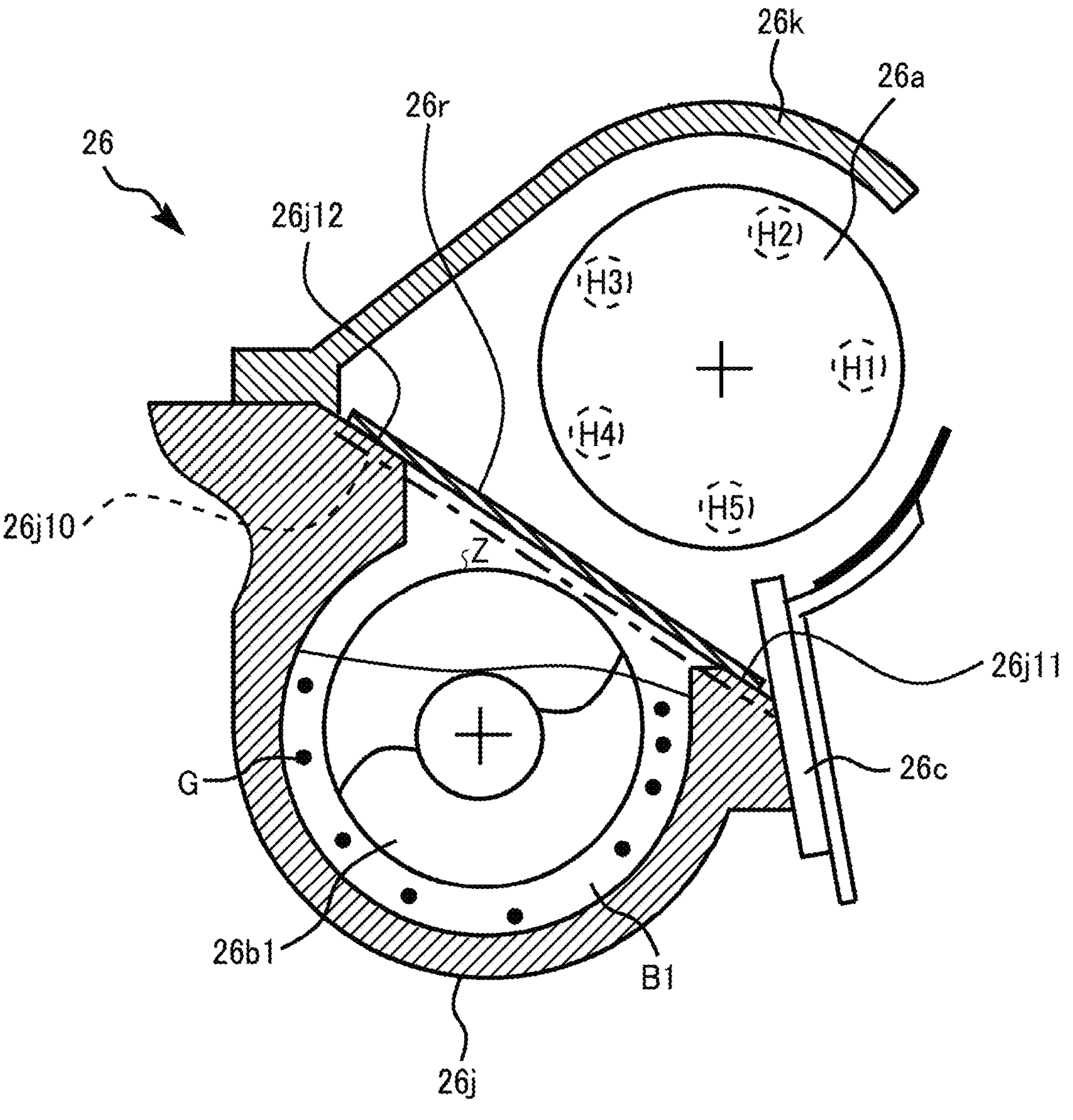
FIG. 4 is an enlarged view of the developing device depicted in FIG. 3, illustrating a main section thereof.

The developing roller 26*a* is disposed opposite the photoconductive drum 21 with a slight gap (e.g., a developing gap) therebetween to form a developing region. As illustrated in FIG. 3, the developing roller 26*a* includes a magnet 26*a*1 and a sleeve 26*a*2. The magnet 26*a*1 is stationarily disposed inside the developing roller 26*a* such that the magnet 26*a*1 does not rotate. As illustrated in FIG. 4, the magnet 26*a*1 includes a plurality of magnetic poles H1, H2, H3, H4, and H5 that is arranged in a circumferential direction of the magnet 26*a*1. The sleeve 26*a*2 rotates around the magnet 26*a*1. The magnet 26*a*1 forms the plurality of magnetic poles H1, H2, H3, H4, and H5 on an outer circumferential surface of the developing roller 26*a*.

For example, as illustrated in FIGS. 3 and 4, the developing device 26 further includes a first conveyance path B1 serving as a conveyance path and an upper developing case 26*k*. The magnetic pole H5 serving as a drawing-up magnetic pole is disposed opposite the doctor blade 26*c* or disposed in proximity to the doctor blade 26*c*. The magnetic pole H5 acts on the carrier particles serving as a magnetic body, drawing a developer G serving as a two-component developer contained in the first conveyance path B1 depicted in FIGS. 2 and 4 onto the developing roller 26*a*. The doctor blade 26*c* depicted in FIG. 2 scrapes a part of the developer G borne on the developing roller 26*a* therefrom and returns the scraped developer G to the first conveyance path B1. Conversely, at a position where the doctor blade 26*c* is applied with a magnetic force from the magnetic pole H5 serving as the drawing-up magnetic pole, the developer G borne on the developing roller 26*a* passes through a doctor gap between the doctor blade 26*c* and the developing roller 26*a*. The developer G fluffs up at a position disposed opposite the magnetic pole H1 serving as a main magnetic pole, forming a magnetic brush that slides over the photoconductive drum 21 in the developing region. Thus, toner particles of the developer G borne on the developing roller 26*a* adhere to an electrostatic latent image on the photoconductive drum 21. Thereafter, the plurality of magnetic poles H2 and H3 serving as conveyance magnetic poles conveys the developer G that has passed the magnetic pole H1 as the main magnetic pole through a gap between the upper developing case 26*k* and the developing roller 26*a*. Thereafter, the developer G is conveyed to a position disposed opposite the magnetic pole H4 serving as a developer-separation magnetic pole. The magnetic pole H4 serving as the developer-separation magnetic pole applies a repulsive magnetic field to carrier particles of the developer G. The repulsive magnetic field acts in a separation direction that separates from the developing roller 26*a*. Thus, the developer G borne on the developing roller 26*a* after the developing process separates from the developing roller 26*a*. The separated developer G falls into the first conveyance path B1. The first conveying screw 26*b*1 depicted in FIGS. 2 and 3 conveys the developer G downstream in the rotation direction D26*b*1 through the first conveyance path B1.

As illustrated in FIGS. 2 and 3, the developing device 26 further includes a circulation path C1, a second conveyance path B2, a first communication port 26*f*, a second communication port 26*g*, and a supply port 26*d*. The first conveying screw 26*b*1 and the second conveying screw 26*b*2 convey the developer G contained in the developing device 26 in a longitudinal direction (e.g., an axial direction) of each of the first conveying screw 26*b*1 and the second conveying screw 26*b*2, forming the circulation path C1 indicated by a broken line arrow in FIG. 3. For example, the first conveyance path B1 formed by the first conveying screw 26*b*1 and the second conveyance path B2 formed by the second conveying screw 26*b*2 define the circulation path C1 of the developer G.

The partition 26*e* serving as a wall isolates the first conveyance path B1 from the second conveyance path B2. The two conveyance paths, that is, the first conveyance path B1 and the second conveyance path B2, communicate with each other through the first communication port 26*f* and the second communication port 26*g* disposed at both lateral ends of each of the first conveyance path B1 and the second conveyance path B2 in a longitudinal direction thereof. For example, as illustrated in FIG. 3, an upstream end of the first conveyance path B1 in a conveyance direction of the developer G communicates with a downstream end of the second conveyance path B2 in the conveyance direction through the first communication port 26*f*. A downstream end of the first conveyance path B1 in the conveyance direction of the developer G communicates with an upstream end of the second conveyance path B2 in the conveyance direction through the second communication port 26*g*. That is, the partition 26*e* is disposed in a span other than both lateral ends of each of the first conveyance path B1 and the second conveyance path B2 in the longitudinal direction thereof.

The first conveying screw 26*b*1 disposed in the first conveyance path B1 is disposed opposite and positioned diagonally below the developing roller 26*a*. The second conveying screw 26*b*2 disposed in the second conveyance path B2 is disposed opposite and positioned below the first conveying screw 26*b*1 disposed in the first conveyance path B1 via the partition 26*e* serving as the wall. While the first conveying screw 26*b*1 conveys the developer G in the axial direction (e.g., the longitudinal direction) thereof, the first conveying screw 26*b*1 supplies the developer G onto the developing roller 26*a* and collects the developer G separated from the developing roller 26*a* after the developing process. While the second conveying screw 26*b*2 conveys the developer G conveyed from the first conveyance path B1 after the developing process and fresh toner replenished through the supply port 26*d* depicted in FIG. 3 in the longitudinal direction of the second conveying screw 26*b*2, the second conveying screw 26*b*2 agitates and mixes the developer G and the fresh toner.

According to the embodiment, the two screws, that is, the first conveying screw 26*b*1 and the second conveying screw 26*b*2, are arranged in a vertical direction. The two screws, that is, the first conveying screw 26*b*1 and the second conveying screw 26*b*2, include rotation shafts 26*b*11 and 26*b*21 serving as shafts and screw portions 26*b*12 and 26*b*22, respectively. The screw portions 26*b*12 and 26*b*22 are wound around the rotation shafts 26*b*11 and 26*b*21, respectively. The first conveying screw 26*b*1 and the second conveying screw 26*b*2 are driven and rotated at a speed of approximately 600 revolutions per minute (rpm).

The circulation path C1 through which the developer G is conveyed to and from the developing roller 26*a* is defined by the first conveyance path B1 and the second conveyance path B2 that are arranged in the vertical direction, not a horizontal direction. Accordingly, the developing device 26 is downsized in the horizontal direction and elongated vertically. For example, in the image forming apparatus 1 as the tandem color image forming apparatus in which the plurality of developing devices 26 of the image forming devices is arranged in the horizontal direction, the plurality of developing devices 26 of the image forming devices is downsized in the horizontal direction. Accordingly, an entirety of the image forming apparatus 1 is downsized in the horizontal direction effectively.

As illustrated in FIG. 2, according to the embodiment, the developing device 26 further includes a lower developing case 26*j*. The upper developing case 26*k* and the lower developing case 26*j* serve as a developing case (e.g., a housing) of the developing device 26.

The lower developing case 26*j* rotatably supports the first conveying screw 26*b*1 and the second conveying screw 26*b*2. Additionally, the lower developing case 26*j* supports the doctor blade 26*c*.

Conversely, the upper developing case 26*k* covers the developing roller 26*a* and the lower developing case 26*j*. As illustrated in FIGS. 2 and 3, the upper developing case 26*k* supports a rotation shaft 26*a*2*x* of the sleeve 26*a*2 of the developing roller 26*a* such that the sleeve 26*a*2 rotates. The upper developing case 26*k* supports a non-rotatable shaft 26*a*1*x* of the magnet 26*a*1 of the developing roller 26*a* such that the magnet 26*a*1 does not rotate. The upper developing case 26*k* is detachably fastened to the lower developing case 26*j* with a snap-on pin, a screw, or the like in a state in which the lower developing case 26*j* supports the first conveying screw 26*b*1, the second conveying screw 26*b*2, and the doctor blade 26*c*.

According to the embodiment, the upper developing case 26*k* supports the developing roller 26*a*. The lower developing case 26*j* supports the first conveying screw 26*b*1, the second conveying screw 26*b*2, and the doctor blade 26*c*. Combination of components supported by the upper developing case 26*k* and the lower developing case 26*j* is not limited to the above. For example, the developing device 26 further includes a first developing side plate 26*k*1. The upper developing case 26*k* may cover the lower developing case 26*j* that supports the developing roller 26*a*, the first conveying screw 26*b*1, the second conveying screw 26*b*2, and the doctor blade 26*c*. In this case, the lower developing case 26*j* may support the first developing side plate 26*k*1 described below.

Figure 5:
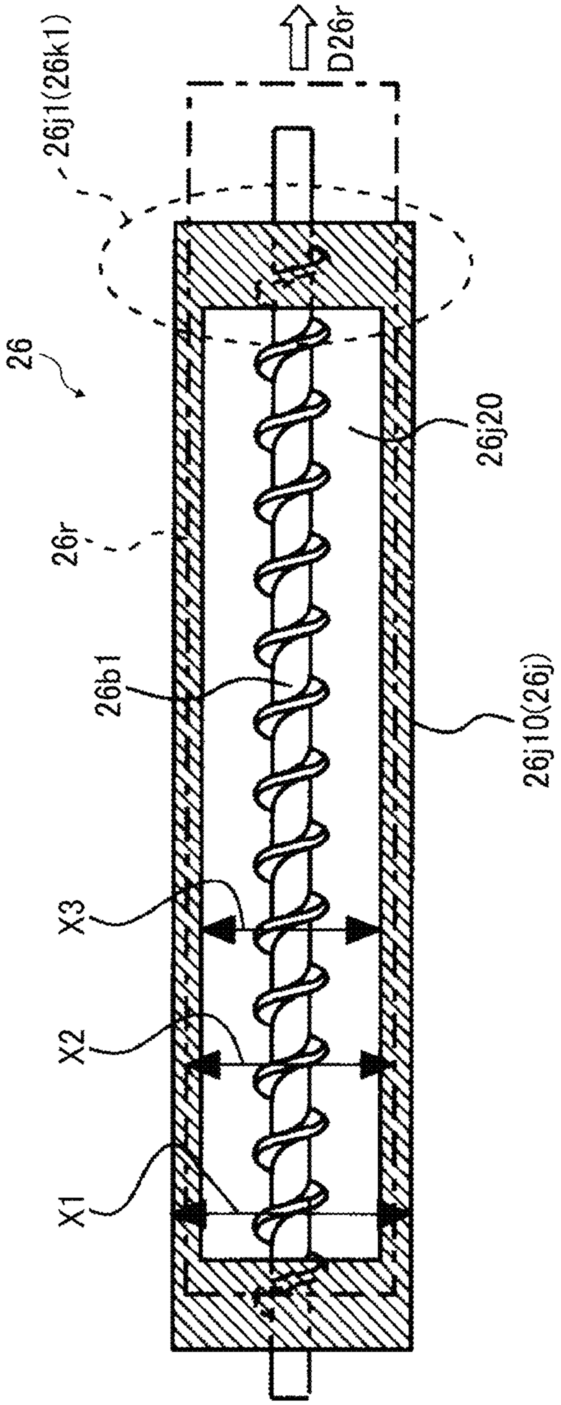
FIG. 5 is a top view of a lower developing case incorporated in the developing device depicted in FIG. 4, illustrating a mount of the lower developing case in a longitudinal direction thereof.
Figure 6:
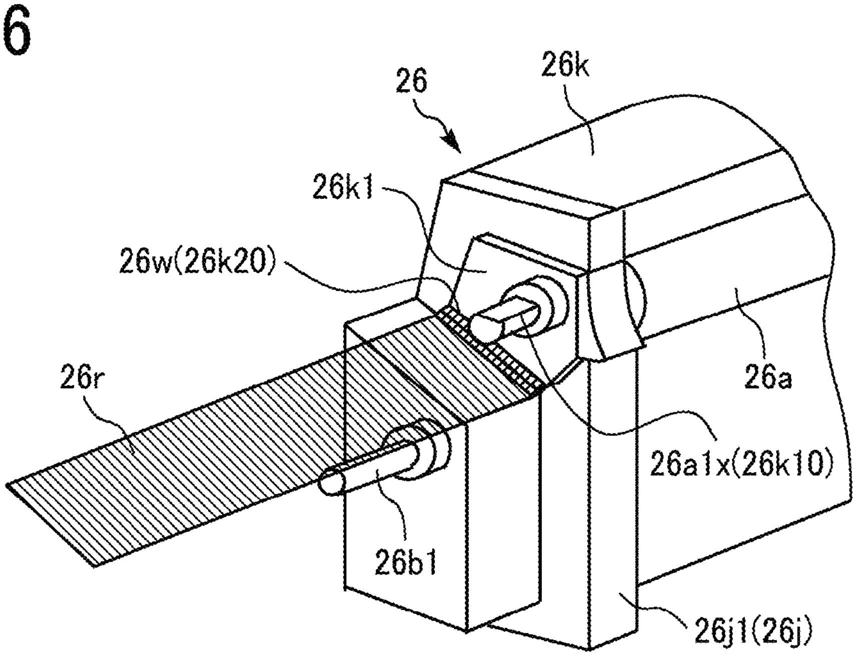
FIG. 6 is a partial perspective view of the developing device depicted in FIG. 4, illustrating a sheet member installed therein.
Figure 7:
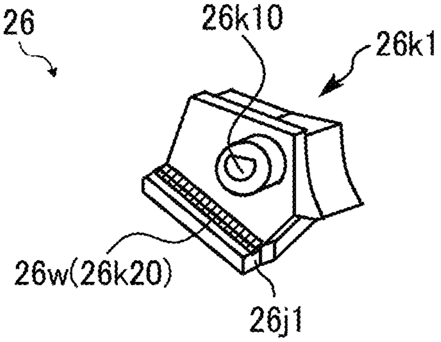
FIG. 7 is a partial perspective view of the developing device depicted in FIG. 6, illustrating a first developing side plate incorporated therein.
Figure 8A:
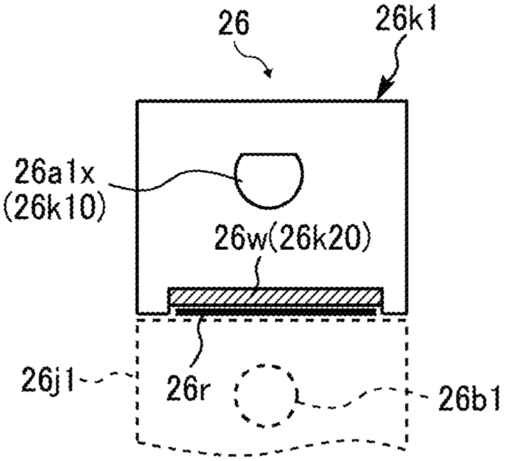
FIG. 8A is a schematic front view of the developing device depicted in FIG. 6, illustrating the first developing side plate and a second developing side plate before the sheet member is removed from the developing device.
Figure 8B:
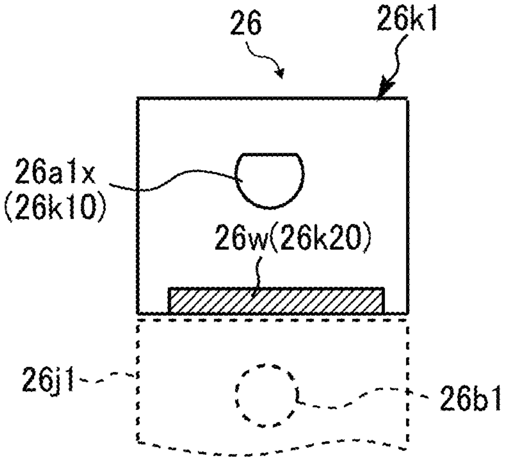
FIG. 8B is a schematic front view of the developing device depicted in FIG. 6, illustrating the first developing side plate and the second developing side plate after the sheet member is removed from the developing device.

As illustrated in FIGS. 5, 6, 7, 8A, and 8B, the first developing side plate 26*k*1 is combined with the upper developing case 26*k*. As illustrated in FIGS. 6, 8A, and 8B, the developing device 26 further includes a second developing side plate 26*j*1 that is combined with the lower developing case 26*j*. A detailed description of a configuration of each of the first developing side plate 26*k*1 and the second developing side plate 26*j*1 is provided below.

A detailed description is provided of the image forming processes described above, focusing on the developing process.

The developing roller 26*a* rotates counterclockwise in FIG. 2 in a predetermined rotation direction D26*a*. As illustrated in FIG. 3, as the first conveying screw 26*b*1 and the second conveying screw 26*b*2 disposed opposite the first conveying screw 26*b*1 via the partition 26*e* rotate counterclockwise in FIG. 2 in rotation directions D26*b*1 and D26*b*2, respectively, the first conveying screw 26*b*1 and the second conveying screw 26*b*2 agitate and mix the developer G inside the developing device 26 together with toner conveyed from the toner container 70 through a toner replenishment path and replenished through the supply port 26*d*, circulating the developer G and the toner in the longitudinal direction of the first conveying screw 26*b*1 and the second conveying screw 26*b*2, that is, in a circulation direction indicated by the broken line arrow in FIG. 3.

The magnetic pole H5 serving as the drawing-up magnetic pole on the developing roller 26*a* draws up toner particles attracted to carrier particles by triboelectric charging onto the developing roller 26*a* together with the carrier particles. The developing roller 26*a* conveys the developer G borne thereon in the rotation direction D26*a* depicted in FIG. 2 to a blade opposed position where the developing roller 26*a* is disposed opposite the doctor blade 26*c*. The doctor blade 26*c* adjusts an amount of the developer G on the developing roller 26*a* to an appropriate amount at the blade opposed position. Thereafter, the developing roller 26*a* conveys the developer G to the developing position (e.g., the developing region) where the photoconductive drum 21 is disposed opposite the developing roller 26*a*. The toner particles of the developer G are attracted to an electrostatic latent image formed on the photoconductive drum 21 by an electric field generated in the developing region.

Thereafter, as the sleeve **26*a*2 of the developing roller 26*a* rotates, the developer G remaining on the developing roller 26*a* reaches an upper portion of the first conveyance path B1 and separates from the developing roller 26*a*. The electric field in the developing region is formed by a predetermined voltage (e.g., a developing bias) applied to the developing roller 26*a* by a power supply for developing and a surface potential (e.g., a latent image potential) formed on the surface of the photoconductive drum 21** in the charging process and the exposure process.

As the developing device 26 consumes the toner, fresh toner contained in the toner container 70 is conveyed through the toner replenishment path and supplied into the developing device 26 properly through the supply port **26*d* depicted in FIG. 3. The developing device 26 further includes a toner density sensor that detects consumption of the toner. The toner density sensor magnetically detects a toner density of the developer G inside the developing device 26** (e.g., a rate of an amount of the toner in the developer G).

The supply port **26*d* is disposed opposite one lateral end of the second conveying screw 26*b*2 in the longitudinal direction thereof (e.g., the horizontal direction in FIG. 3) and an upper portion of the second conveyance path B2 defined by the second conveying screw 26*b*2**.

A description is provided of a construction of a comparative developing device.

Before the comparative developing device is installed in an image forming apparatus and used, in order to prevent a developer that prefills an interior of the comparative developing device from leaking to an outside of the comparative developing device, a sheet member divides the interior of the comparative developing device to form an enclosed space that contains the developer. The sheet member serves as a partition between a developing roller and a first conveying screw serving as a developer supplying rotator.

Before the image forming apparatus is used, the sheet member is pulled out from an opening (e.g., a sheet opening) of a developing side plate in a longitudinal direction parallel to an axial direction of the developing roller. Hence, the developer spreads throughout an entire interior of the comparative developing device. Thus, the comparative developing device is ready to start a developing process for image formation.

In the developing process, as the developer supplying rotator and the developing roller rotate, substantial vibration may generate and may be transmitted to the developing side plate. Even if a seal such as sponge seals the sheet opening, the developer (e.g., toner) may leak through the sheet opening to the outside of the comparative developing device.

A description is provided of advantageous construction and operation of the developing device 26 of the image forming apparatus 1 according to an embodiment of the present disclosure in detail.

The developing device 26 according to the embodiment is removably installed in the image forming apparatus 1 such that the developing device 26 is replaceable. The developing device 26 is replaced with a new one or a recycled one at a predetermined replacement cycle.

As described above with reference to FIG. 2, the developing device 26 includes the developing case constructed by the upper developing case **26*k* and the lower developing case 26*j*. The developing case accommodates the developing roller 26*a*, the first conveying screw 26*b*1 serving as the developer supplying rotator, the second conveying screw 26*b*2**, and the like.

The developing roller **26*a* is disposed diagonally above the first conveying screw 26*b*1 serving as the developer supplying rotator. The developing device 26 includes the doctor blade 26*c* that is disposed opposite and below the developing roller 26*a*. The doctor blade 26*c* serves as the developer regulator that regulates an amount of the developer G borne on a surface of the developing roller 26*a*. The doctor blade 26*c* is mounted on the lower developing case 26*j***.

As illustrated in FIG. 4, the developing device 26 according to the embodiment further includes a sheet member **26*r* serving as a sealing member. Before the image forming apparatus 1 starts operation, in order to prevent the developer G contained in an interior of the developing device 26 (e.g., the developer G that prefills the interior of the developing device 26 before the developing device 26 is dispatched from a factory) from leaking to an outside of the developing device 26, the sheet member 26*r* serves as a partition between the developing roller 26*a* and the first conveying screw 26*b*1 serving as the developer supplying rotator. The sheet member 26*r* forms an enclosed space that contains the developer G in a compartment (e.g., the first conveyance path B1) of the developing device 26 where the first conveying screw 26*b*1 is disposed. The sheet member 26*r* is removable from the developing device 26**.

For example, the sheet member **26*r* has a thickness in a range of from approximately 0.1 mm to approximately 0.5 mm and is made of a transparent resin material such as an overhead projector (OHP) transparency and Mylar®. The sheet member 26*r* is substantially rectangular and extended in an axial direction of the developing roller 26*a*, the first conveying screw 26*b*1, and the second conveying screw 26*b*2, that is, a horizontal direction in FIG. 5. As illustrated in FIGS. 4 and 5, the lower developing case 26*j* includes a mount 26*j*10 having a slot 26*j*20 through which a compartment where the developing roller 26*a* is disposed communicates with a compartment (e.g., the first conveyance path B1) where the first conveying screw 26*b*1 is disposed. The sheet member 26*r* covers the slot 26*j*20 of the mount 26*j*10. The sheet member 26*r* is adhered or attached to the mount 26*j*10** with double-sided adhesive tape, thermal bonding, or the like.

As illustrated in FIGS. 4 to 6, the developing device 26, either a new one or a recycled one, is shipped from the factory in a state in which the developing device 26 is installed with the sheet member **26*r*. For example, in the factory, the interior (e.g., the first conveyance path B1 and the second conveyance path B2) of the developing device 26 assembled with the lower developing case 26*j* is filled with the developer G. Thereafter, the sheet member 26*r* is adhered to the mount 26*j*10 of the lower developing case 26*j* such that the sheet member 26*r* seals the first conveyance path B1 and the second conveyance path B2 to prevent leakage of the developer G. The upper developing case 26*k* covers the lower developing case 26*j* attached with the sheet member 26*r*. Thus, the developing device 26** prefilled with the developer G is manufactured for shipment.

As illustrated in FIGS. 5 and 6, the sheet member **26*r* installed in the developing device 26 has one lateral end (e.g., a part) in a longitudinal direction thereof (e.g., a direction perpendicular to a paper surface of FIG. 4 or the horizontal direction in FIG. 5). The one lateral end of the sheet member 26*r* projects toward the outside of the developing device 26 through a clearance between the first developing side plate 26*k*1 of the upper developing case 26*k* and the second developing side plate 26*j*1 of the lower developing case 26*j*. The clearance is a sheet slit 26*k*20** illustrated in FIGS. 6, 8A, and 8B. As the user holds and pulls the projected lateral end of the sheet member 26*r* in a pulling direction D26*r* depicted in FIG. 5, the slot 26*j*20 of the mount 26*j*10 opens and the developing device 26 is ready for image formation.

In a state in which the sheet member 26*r* seals and encloses the developer G contained in the developing device 26 configured as described above as illustrated in FIG. 4, the developing device 26 is installed in the image forming apparatus 1. The developing device 26 as a new one is installed in the image forming apparatus 1 as a new one and shipped, in a first case. The developing device 26 as a new one for replacement is installed in the image forming apparatus 1 as a used one that is already used by the user, in a second case.

In any of the first case and the second case, before the user starts using the image forming apparatus 1 installed with the developing device 26 as the new one in the developing process, the user pulls out the sheet member 26*r* that seals and encloses the developer G from the developing device 26. The developing device 26 depicted in FIG. 2 performs the developing process of the normal image forming processes.

As described above, according to the embodiment, in either the second case in which the developing device 26 for replacement is shipped or transported independently or the first case in which the developing device 26 installed in the image forming apparatus 1 is shipped or transported, the sheet member 26*r* seals the developer G contained in the developing device 26 in advance. Accordingly, the sheet member 26*r* prevents the developer G contained in the developing device 26 from leaking to the outside of the developing device 26 by vibration and the like that generate while the developing device 26 is transported.

For example, according to the embodiment, as illustrated in FIG. 4, the sheet member 26*r* serves as the partition between the developing roller 26*a* and the first conveying screw 26*b*1 inside the developing device 26, forming the enclosed space.

Accordingly, the surface of the developing roller 26*a* does not bear the developer G while the developing device 26 is transported, preventing the developer G from staining hands of the user precisely even if the user touches the surface of the developing roller 26*a*. Even if the image forming apparatus 1 as the new one installed with the developing device 26 as the new one is shipped from the factory, the surface of the developing roller 26*a* does not bear the developer G while the image forming apparatus 1 is transported, preventing the developer G from damaging the surface of the photoconductive drum 21.

As illustrated in FIG. 4, according to the embodiment, the doctor blade 26*c* serving as the developer regulator is disposed opposite and below the developing roller 26*a* that is disposed diagonally above the first conveying screw 26*b*1.

The mount 26*j*10 includes a downstream sheet adhesion portion 26*j*11 and an upstream sheet adhesion portion 26*j*12 in the rotation direction D26*a* of the developing roller 26*a* depicted in FIG. 2. The downstream sheet adhesion portion 26*j*11 is disposed at a position lower than a summit Z of the first conveying screw 26*b*1 serving as the developer supplying rotator. The upstream sheet adhesion portion 26*j*12 is disposed at a position higher than the summit Z of the first conveying screw 26*b*1.

Accordingly, the sheet member 26*r* is perpendicular to a hypothetical line connecting a center of rotation of the developing roller 26*a* and a center of rotation of the first conveying screw 26*b*1. The sheet member 26*r* situated as described above divides a space between the developing roller 26*a* and the first conveying screw 26*b*1 efficiently. Hence, a distance between the developing roller 26*a* and the first conveying screw 26*b*1 disposed opposite the developing roller 26*a* is shortened, downsizing and lightweighting the developing device 26 and reducing an amount of the developer G that prefills the developing device 26.

As illustrated in FIG. 5, the developing device 26 according to the embodiment has a span X1 of the mount 26*j*10 in a short direction thereof, a span X2 of the sheet member 26*r* in a short direction thereof, and a span X3 of the slot 26*j*20 in a short direction thereof. The span X2 is within the span X1 and encompasses the span X3.

For example, the span X1 defines a width of an outer periphery of the mount 26*j*10 in the short direction thereof. The span X3 defines a width of the slot 26*j*20 in the short direction thereof. The span X2 defines a width of the sheet member 26*r* in the short direction thereof. The spans X1, X2, and X3 define a relation of X1>X2>X3.

Accordingly, the sheet member 26*r* seals the slot 26*j*20 precisely. When the user starts using the developing device 26, the user pulls out the sheet member 26*r* in the pulling direction D26*r* readily.

As illustrated in FIGS. 6, 7, 8A, and 8B, the developing device 26 according to the embodiment includes the first developing side plate 26*k*1 and the second developing side plate 26*j*1 that construct a developing side plate disposed at one lateral end of the developing device 26 in the longitudinal direction thereof.

According to the embodiment, the second developing side plate 26*j*1 is combined with the lower developing case 26*j* that supports the first conveying screw 26*b*1 and the second conveying screw 26*b*2 rotatably.

The first developing side plate 26*k*1 is combined with the upper developing case 26*k* that covers the developing roller 26*a* and constructs the developing case together with the lower developing case 26*j*.

As described above, the first developing side plate 26*k*1 and the second developing side plate 26*j*1 may be combined with the lower developing case 26*j*. The lower developing case 26*j* may support the developing roller 26*a*, the first conveying screw 26*b*1, the second conveying screw 26*b*2, and the doctor blade 26*c*.

The first developing side plate 26*k*1 serving as an upper developing side plate has a D-shaped through-hole 26*k*10 serving as a magnet positioner that positions the magnet 26*a*1 of the developing roller 26*a* depicted in FIG. 3 in the circumferential direction of the magnet 26*a*1.

As illustrated in FIGS. 3 and 4, the magnet 26*a*1 serves as a magnetic pole forming member that includes the plurality of magnetic poles H1, H2, H3, H4, and H5 that is arranged in the circumferential direction of the magnet 26*a*1. The magnet 26*a*1 is disposed inside the sleeve 26*a*2 of the developing roller 26*a*. The magnet 26*a*1 includes the non-rotatable shaft 26*a*1*x* disposed at one lateral end of the magnet 26*a*1 in the longitudinal direction of the developing roller 26*a*. As illustrated in FIG. 6, the non-rotatable shaft 26*a*1*x* includes a D-shaped portion disposed at an end of the non-rotatable shaft 26*a*1*x* in the longitudinal direction of the developing roller 26*a*. The non-rotatable shaft 26*a*1*x* engages the D-shaped through-hole 26*k*10 serving as the magnet positioner of the first developing side plate 26*k*1. The magnet 26*a*1 is supported in the developing device 26 such that the magnet 26*a*1 does not rotate. Since the magnet 26*a*1 is supported such that the magnet 26*a*1 does not rotate, the magnetic poles H1, H2, H3, H4, and H5 are formed on the developing roller 26*a* that rotates in the predetermined rotation direction D26*a* in the developing process.

As described above, the first developing side plate **26*k*1 supports the non-rotatable shaft 26*a*1*x* of the magnet 26*a*1 that does not rotate. Hence, compared to a configuration in which a first developing side plate supports a shaft that rotates, even if the developing device 26 operates in the developing process, vibration generated by the developing device 26 is not transmitted to the first developing side plate 26*k*1** easily.

On the other hand, the second developing side plate **26*j*1 serving as a lower developing side plate is coupled with the first developing side plate 26*k*1, forming the developing side plate. The second developing side plate 26*j*1 rotatably supports the first conveying screw 26*b*1** serving as the developer supplying rotator.

As illustrated in FIGS. 6, 7, 8A and 8B, the first developing side plate **26*k*1 includes the sheet slit 26*k*20 that is disposed opposite the second developing side plate 26*j*1. A part (e.g., one lateral end) of the sheet member 26*r* protrudes toward the outside of the developing device 26 through the sheet slit 26*k*20**.

For example, the sheet slit **26*k*20 is a recess disposed opposite the second developing side plate 26*j*1. The sheet slit 26*k*20 includes a lower face (e.g., a bottom face of the first developing side plate 26*k*1) that defines a substantially identical plane with a surface (e.g., an upper face) of the mount 26*j*10**.

The developing device 26 further includes a seal **26*w* that is mounted on the first developing side plate 26*k*1. The seal 26*w* seals the sheet slit 26*k*20 before and after the sheet member 26*r* is removed from the developing device 26**.

For example, the seal **26*w* is a substantially rectangular sealing member made of an elastic material such as polyurethane foam. The seal 26*w* includes an upper face that is adhered to an upper face of the sheet slit 26*k*20 in FIGS. 8A and 8B with double-sided adhesive tape. The seal 26*w* is sufficiently greater than the sheet slit 26*k*20 in size (e.g., a size in a height direction of the seal 26*w*). As the seal 26*w* is deformed elastically by the sheet slit 26*k*20, the seal 26*w* seals the sheet slit 26*k*20**.

As illustrated in FIG. 8A, before the sheet member **26*r* is removed from the developing device 26, that is, while the sheet member 26*r* is placed in the developing device 26, the seal 26*w* adhered to the sheet slit 26*k*20 of the first developing side plate 26*k*1 presses against the second developing side plate 26*j*1 such that the seal 26*w* and the second developing side plate 26*j*1 sandwich the sheet member 26*r*. Thus, the seal 26*w* seals the sheet slit 26*k*20 to prevent the developer G from leaking through the sheet slit 26*k*20 to the outside of the developing device 26**.

As illustrated in FIG. 8B, after the sheet member **26*r* is pulled out and removed from the developing device 26, the seal 26*w* adhered to the sheet slit 26*k*20 of the first developing side plate 26*k*1 presses against the second developing side plate 26*j*1 directly. Thus, the seal 26*w* seals the sheet slit 26*k*20 to prevent the developer G from leaking through the sheet slit 26*k*20 to the outside of the developing device 26**.

As described above, the developing device 26 according to the embodiment includes the sheet slit **26*k*20 that is disposed in the first developing side plate 26*k*1 to which vibration is not transmitted easily in the developing process. Hence, compared to a configuration in which a sheet slit is disposed in a developing side plate to which vibration is transmitted readily in the developing process, the developer G (e.g., toner) does not leak through the sheet slit 26*k*20 to the outside of the developing device 26** easily.

Figure 9:
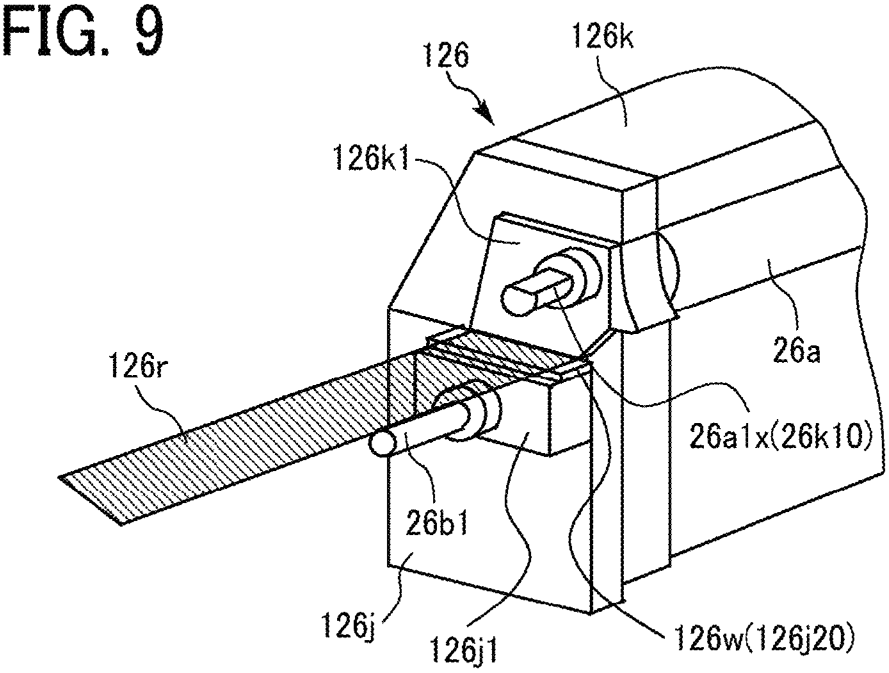
FIG. 9 is a partial perspective view of a developing device as a comparative example, illustrating a sheet member installed therein.
Figure 10:
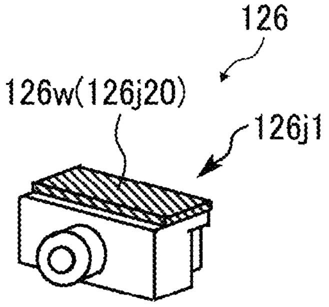
FIG. 10 is a partial perspective view of the developing device depicted in FIG. 9, illustrating a second developing side plate incorporated therein.

For example, as illustrated in FIGS. 9 and 10, a developing device 126 as a comparative example includes a first developing side plate **126*k*1 and a second developing side plate 126*j*1. A sheet slit 126*j*20 is disposed in the second developing side plate 126*j*1 of a lower developing case 126*j*. A sheet member 126*r* is pulled out from the developing device 126 through the sheet slit 126*j*20. Accordingly, vibration generated in the developing process (e.g., vibration generated by rotation of the first conveying screw 26*b*1) may be transmitted to the second developing side plate 126*j*1 directly. Even if a seal 126*w* seals the sheet slit 126*j*20, toner (e.g., the developer G) may leak through the sheet slit 126*j*20 to an outside of the developing device 126** easily.

To address the circumstance, the developing device 26 according to the embodiment includes the sheet slit **26*k*20 that is disposed in the first developing side plate 26*k*1 to which vibration is not transmitted easily, preventing disadvantages of the developing device 126** as the comparative example.

The sheet slit **26*k*20 disposed in the first developing side plate 26*k*1 is positioned at an increased height. Accordingly, the sheet slit 26*k*20 is disposed above a boundary surface of bulk of the developer G inside the developing device 26. If a joint between a developing case and a bearing (e.g., a bearing mounted on a developing side plate) is disposed below the boundary surface of bulk of the developer G, that is, in the developer G contained in the developing device 26, while the developing device 26 operates, the developer G is susceptible to entering a slight gap or the like between the developing case and the bearing and may leak through the slight gap. To address the circumstance, the sheet slit 26*k*20** is disposed above the boundary surface of bulk of the developer G, reducing leakage of the developer G.

In a case that the sheet slit **26*k*20 is disposed in the first developing side plate 26*k*1 or the second developing side plate 126*j*1, the first developing side plate 26*k*1 or the second developing side plate 126*j*1 includes a tubular portion that engages a support and positions the first developing side plate 26*k*1 or the second developing side plate 126*j*1. The first developing side plate 26*k*1 or the second developing side plate 126*j*1 further includes a planar portion that defines the sheet slit 26*k*20. Thus, the first developing side plate 26*k*1 or the second developing side plate 126*j*1 has a complex shape formed by the tubular portion and the planar portion, degrading accuracy of parts of the first developing side plate 26*k*1 or the second developing side plate 126*j*1. Degradation in accuracy of parts is also applied to a shape of a developing case (e.g., the lower developing case 26*j* and an upper developing case 126*k*) that engages the first developing side plate 26*k*1 or the second developing side plate 126*j*1. Accordingly, in view of assembly of a developing device and leakage of the developer G, an increased accuracy of an engaging portion is generally requested to both the developing case and the bearing. Assembly of the developing device is subject to degradation as tolerance is excessively tight. Leakage prevention of the developer G is subject to degradation as tolerance is excessively loose. The bearing is mounted on the first developing side plate 26*k*1 and the second developing side plate 126*j*1. The increased accuracy of the engaging portion may degrade yield of parts, increase costs for meticulous production management and the like, and generate issues in management of parts. Conversely, in the developing device 26 according to the embodiment, the sheet slit 26*k*20 is disposed above the boundary surface of bulk of the developer G. Accordingly, the sheet slit 26*k*20** loosens tolerance management to prevent leakage of the developer G, preventing various disadvantages described above.

A description is provided of a construction of a developing device 26A as a first modification example of the developing device 26.

Figure 11A:
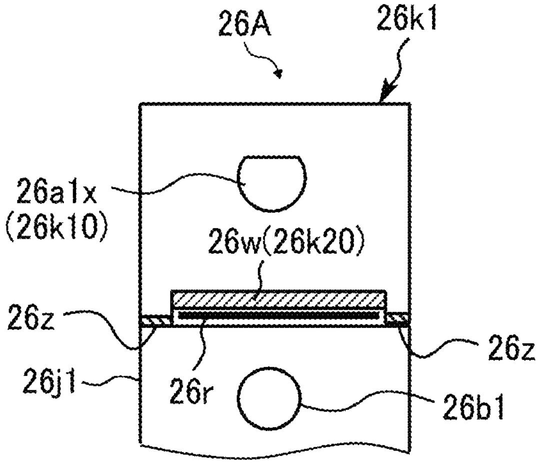
FIG. 11A is a schematic front view of a developing device as a first modification example of the developing device depicted in FIG. 8A, illustrating the first developing side plate and the second developing side plate incorporated therein before the sheet member is removed from the developing device.
Figure 11B:
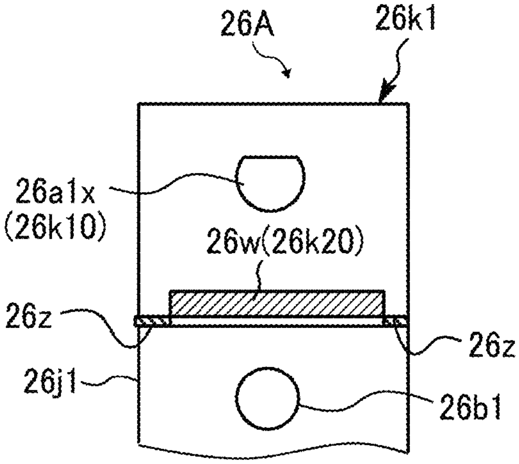
FIG. 11B is a schematic front view of the developing device as the first modification example depicted in FIG. 11A after the sheet member is removed from the developing device.

As illustrated in FIGS. 11A and 11B, the developing device 26A as the first modification example includes a cushioning member 26*z* interposed between the first developing side plate 26*k*1 and the second developing side plate 26*j*1. The cushioning member 26*z* is made of a urethane sheet or the like.

The cushioning member 26*z* reduces transmission of vibration from the second developing side plate 26*j*1 to the first developing side plate 26*k*1, reducing leakage of the developer G (e.g., toner) through the sheet slit 26*k*20 to an outside of the developing device 26A.

A description is provided of a construction of a developing device 26B as a second modification example of the developing device 26.

Figure 12:
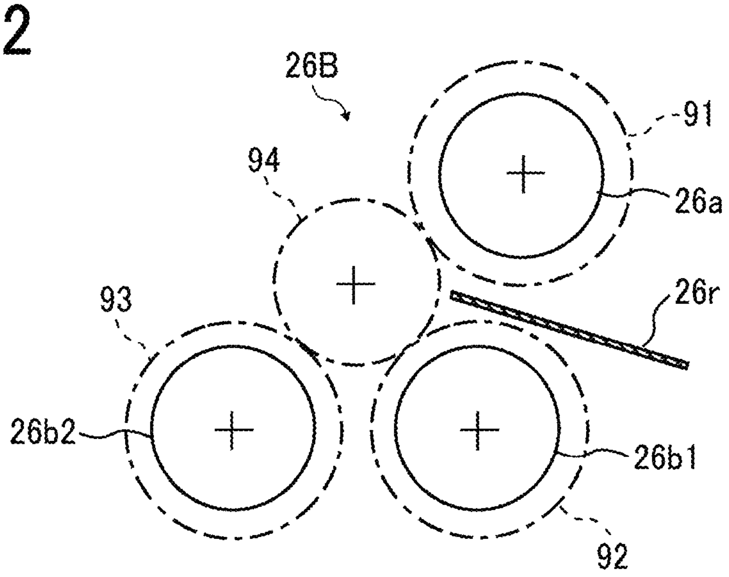
FIG. 12 is a diagram of a developing device as a second modification example of the developing device depicted in FIG. 2, illustrating a positional relation between a gear train incorporated therein and the sheet member.

As illustrated in FIG. 12, the developing device 26B as the second modification example includes a first gear 91, a second gear 92, a third gear 93, and an idler gear 94. The first gear 91 is mounted on the rotation shaft 26*a*2*x* of the developing roller 26*a* depicted in FIG. 3. The second gear 92 is mounted on the rotation shaft 26*b*11 of the first conveying screw 26*bi* serving as the developer supplying rotator depicted in FIG. 3. The third gear 93 is mounted on the rotation shaft 26*b*21 of the second conveying screw 26*b*2 depicted in FIG. 3. The idler gear 94 meshes with the first gear 91, the second gear 92, and the third gear 93. The first gear 91, the second gear 92, the third gear 93, and the idler gear 94 are disposed at one lateral end (e.g., a driving end) of the developing device 26B in a longitudinal direction thereof. The developing device 26B further includes a driving motor that generates a driving force. As the driving force is transmitted to one of the first gear 91, the second gear 92, the third gear 93, and the idler gear 94, the developing roller 26*a*, the first conveying screw 26*bi*, and the second conveying screw 26*b*2 rotate in predetermined rotation directions D26*a*, D26*bi*, and D26*b*2, respectively.

As illustrated in FIG. 12, the developing device 26B as the second modification example includes the sheet member 26*r*. On a cross section perpendicular to axial directions of the rotation shafts 26*a*2*x* and 26*b*11, respectively, the sheet member 26*r* is disposed in a space enclosed by the first gear 91, the second gear 92, and the idler gear 94.

With the construction of the developing device 26B, even in a case that the user pulls out the sheet member 26*r* from one lateral end (e.g., the driving end) of the developing device 26B in the longitudinal direction thereof, the sheet member 26*r* does not interfere with the first gear 91, the second gear 92, and the idler gear 94.

For example, in the developing device 26B as the second modification example, an outer diameter (e.g., an addendum circle diameter) of the idler gear 94 is smaller than an outer diameter (e.g., an addendum circle diameter) of the first gear 91 and an outer diameter (e.g., an addendum circle diameter) of the second gear 92. Hence, in the space enclosed by the first gear 91, the second gear 92, and the idler gear 94, the sheet member 26*r* has a width that is increased relatively in the short direction thereof. Accordingly, the slot 26*j*20 of the mount 26*j*10 ensures an opening width in the short direction of the slot 26*j*20.

A description is provided of a construction of a developing device 26C as a third modification example of the developing device 26.

Figure 13:
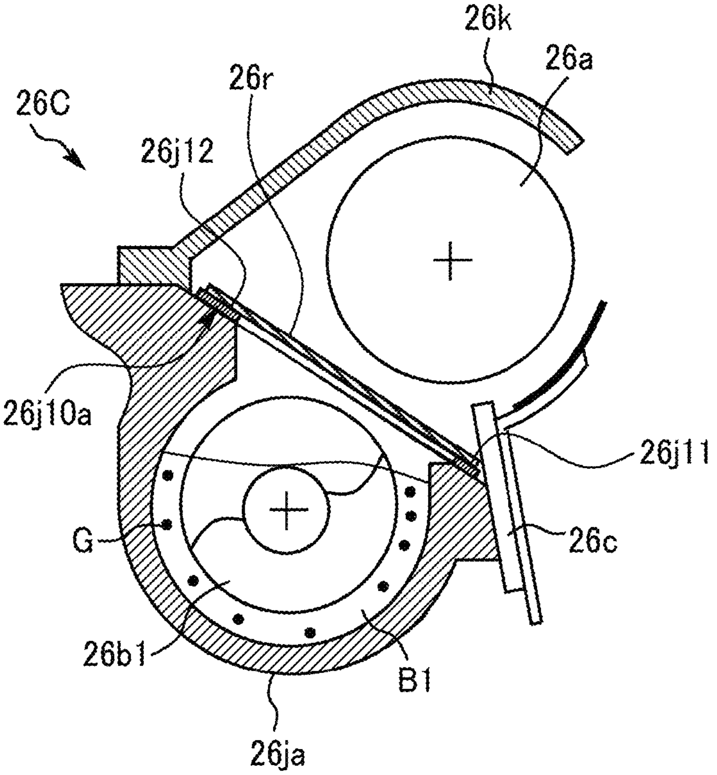
FIG. 13 is an enlarged cross-sectional view of a developing device as a third modification example of the developing device depicted in FIG. 4, illustrating a main section thereof.

As illustrated in FIG. 13, the developing device 26C as the third modification example includes a lower developing case 26*ja* and a mount 26*j*10*a* disposed on the lower developing case 26*ja*.

In the developing device 26C as the third modification example, the mount 26*j*10*a* is not combined with the lower developing case 26*ja* as a part thereof. The mount 26*j*10*a* is adhered or attached to the lower developing case 26*ja* with double-sided adhesive tape, an adhesive, or the like as a separate part that is separated from the lower developing case 26*ja*.

The mount 26*j*10*a* includes the slot 26*j*20. The sheet member 26*r* is attached to the mount 26*j*10*a* and covers the slot 26*j*20. When the user starts using the developing device 26C, the user pulls out the sheet member 26*r* from the mount 26*j*10*a*. After the user starts using the developing device 26C, the mount 26*j*10*a* still functions as a part of the lower developing case 26*ja*.

As described above, the mount 26*j*10*a* is adhered to the lower developing case 26*ja* as a separate part that is separated from the lower developing case 26*ja*. In a case that the lower developing case 26*ja* is made of a material that is not adhered with the sheet member 26*r* by thermal welding or with double-sided adhesive tape, for example, the mount 26*j*10*a* is made of a material that is adhered with the sheet member 26*r* by thermal welding or with double-sided adhesive tape.

As described above, a developing device (e.g., the developing devices 26, 26A, 26B, and 26C) according to the embodiments of the present disclosure is removably installed in the apparatus body of the image forming apparatus 1. The developing device contains the developer G. The developing device includes the developing roller 26*a*, the first conveying screw 26*b*1, the sheet member 26*r*, the first developing side plate 26*k*1, and the second developing side plate 26*j*1. The developing roller 26*a* includes the magnet 26*a*1 including the plurality of magnetic poles H1, H2, H3, H4, and H5 that is arranged in the circumferential direction of the magnet 26*a*1. The developing roller 26*a* develops a latent image formed on the surface of the photoconductive drum 21 serving as the image bearer. The first conveying screw 26*b*1 serving as the developer supplying rotator is disposed opposite the developing roller 26*a* and rotates in the predetermined rotation direction D26*b*1 to supply the developer G onto the developing roller 26*a*. In order to prevent the developer G contained in an interior of the developing device from leaking to an outside of the developing device, the sheet member 26*r* serves as a partition between the developing roller 26*a* and the first conveying screw 26*b*1. The sheet member 26*r* forms an enclosed space that contains the developer G in a compartment (e.g., the first conveyance path B1) in the interior of the developing device. The compartment accommodates the first conveying screw 26*b*1. The sheet member 26*r* is removable from the developing device. The first developing side plate 26*k*1 has the D-shaped through-hole 26*k*10 serving as the magnet positioner that positions the magnet 26*a*1 in the circumferential direction of the magnet 26*a*1. The first developing side plate 26*k*1 and the second developing side plate 26*j*1 define a developing side plate. The first developing side plate 26*k*1 supports the first conveying screw 26*b*1 such that the first conveying screw 26*b*1 is rotatable. The first developing side plate 26*k*1 includes the sheet slit 26*k*20 that is disposed opposite the second developing side plate 26*j*1. A part of the sheet member 26*r* protrudes toward the outside of the developing device through the sheet slit 26*k*20.

Accordingly, the sheet member 26*r* prevents toner of the developer G from leaking to the outside of the developing device through the sheet slit 26*k*20 of the first developing side plate 26*k*1. The sheet member 26*r* is removed from the developing device through the sheet slit 26*k*20.

According to the embodiments, the developing device is not a component incorporated in the process cartridge 20. The developing device is a unit that is attached to and detached from the apparatus body of the image forming apparatus 1 independently. Conversely, the developing device may be a component incorporated in a process cartridge. The developing device incorporated in the process cartridge as a unit may be attached to and detached from the apparatus body of the image forming apparatus 1.

The developing device incorporated in the process cartridge also attains advantages similar to the advantages of the developing device according to the embodiments of the present disclosure.

In the present disclosure, the process cartridge defines a unit into which an image bearer and at least one of a charger, a developing device, or a cleaner are combined. The charger charges the image bearer. The developing device develops a latent image formed on a surface of the image bearer. The cleaner cleans the surface of the image bearer. The process cartridge as the unit is attached to and detached from the apparatus body of the image forming apparatus 1.

According to the embodiments described above, the technology of the present disclosure is applied to the developing device that includes the two screws, that is, the first conveying screw 26*b*1 and the second conveying screw 26*b*2, and the doctor blade 26*c*. The first conveying screw 26*b*1 and the second conveying screw 26*b*2 serve as conveyors that are arranged horizontally or vertically and extended horizontally. The doctor blade 26*c* is disposed below the developing roller 26*a*. Alternatively, the developing device applied with the technology of the present disclosure may have other configurations. For example, the technology of the present disclosure may be applied to a developing device that includes three or more conveyors that are arranged horizontally or vertically and extended horizontally, a developing device that includes a plurality of conveyors that is arranged vertically, or a developing device that includes a doctor blade that is disposed above a developing roller.

According to the embodiments described above, the technology of the present disclosure is applied to the developing device 26 that includes the first conveying screw 26*b*1 serving as a conveying screw or the developer supplying rotator that includes the screw portion 26*b*12 wound around the rotation shaft 26*b*11. However, the developer supplying rotator is not limited to the first conveying screw 26*b*1. For example, the technology of the present disclosure may be applied to a developing device that includes a conveying paddle, serving as a developer supplying rotator, provided with a plurality of blades arranged on a rotation shaft radially in a circumferential direction of the rotation shaft.

The above-described configurations also attain advantages similar to the advantages of the embodiments described above.

The technology of the present disclosure is not limited to the embodiments described above. The embodiments of the present disclosure are modified properly to configurations or constructions other than those suggested in the embodiments described above within the scope of the technology of the present disclosure. The number, the position, the shape, and the like of the elements and the components according to the embodiments of the present disclosure are not limited to those suggested in the embodiments described above and are modified to the number, the position, the shape, and the like that are appropriate to achieve the technology of the present disclosure.

A description is provided of advantages of a developing device (e.g., the developing devices 26, 26A, 26B, and 26C).

The developing device is removably installed in an apparatus body of an image forming apparatus (e.g., the image forming apparatus 1). The developing device contains a developer (e.g., the developer G).

The developing device includes a developing roller (e.g., the developing roller 26*a*), a developer supplying rotator (e.g., the first conveying screw 26*b*1), a sheet member (e.g., the sheet member 26*r*), a first developing side plate (e.g., the first developing side plate 26*k*1), and a second developing side plate (e.g., the second developing side plate 26*j*1).

The developing roller includes a magnet (e.g., the magnet 26*al*) including a plurality of magnetic poles (e.g., the magnetic poles H1, H2, H3, H4, and H5) that is arranged in a circumferential direction of the magnet. The developing roller develops a latent image formed on a surface of an image bearer (e.g., the photoconductive drum 21). The first developing side plate includes a magnet positioner (e.g., the D-shaped through-hole 26*k*10) that positions the magnet in the circumferential direction of the magnet. The developer supplying rotator is disposed opposite the developing roller and rotates in a predetermined direction (e.g., the rotation direction D26*b*1) to supply the developer onto the developing roller. The first developing side plate and the second developing side plate define a developing side plate. The second developing side plate supports the developer supplying rotator rotatably.

In order to prevent the developer contained in an interior of the developing device from leaking to an outside of the developing device, the sheet member separates the developing roller from the developer supplying rotator. The sheet member forms an enclosed space that contains the developer in a compartment (e.g., the first conveyance path B1) of the developing device. The compartment accommodates the developer supplying rotator. The sheet member is removable from the developing device. The first developing side plate includes a sheet opening (e.g., the sheet slit 26*k*20) that is disposed opposite the second developing side plate. A part of the sheet member protrudes toward the outside of the developing device through the sheet opening.

Accordingly, the sheet member prevents toner of the developer from leaking to the outside of the developing device through the sheet opening of the first developing side plate. The sheet member is removed from the developing device through the sheet opening. The sheet member is incorporated in the developing device, a process cartridge, or the image forming apparatus.

According to the embodiments described above, the image forming apparatus 1 is a copier. Alternatively, the image forming apparatus 1 may be a printer, a facsimile machine, a multifunction peripheral (MFP) having at least two of copying, printing, scanning, facsimile, and plotter functions, or the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A developing device, the developing device comprising:

a developing roller configured to bear a developer, the developing roller including a magnet including a plurality of magnetic poles arranged in a circumferential direction of the magnet;

a developer supplying rotator disposed opposite the developing roller, the developer supplying rotator configured to rotate in a predetermined direction to supply the developer onto the developing roller;

a compartment accommodating the developer supplying rotator;

a first developing side plate including a through hole configured to position the magnet in the circumferential direction of the magnet;

a seal mounted on the first developing side plate;

a second developing side plate supporting the developer supplying rotator rotatably; and a sheet member configured to separate the developing roller from the developer supplying rotator, the sheet member configured to form an enclosed space that contains the developer in the compartment, the sheet member configured to be removed from the developing device, wherein the first developing side plate includes a sheet opening disposed opposite the second developing side plate, the sheet opening through which a part of the sheet member protrudes toward an outside of the developing device, wherein the magnet includes a non-rotatable shaft, wherein the non-rotatable shaft is disposed at a lateral end of the magnet and the non-rotatable shaft is engaged with the through hole, and wherein the seal is mounted on the sheet opening of the first developing side plate and the seal presses against the second developing side plate.

2. The developing device according to claim 1, wherein the seal is configured to seal the sheet opening before and after the sheet member is removed from the developing device.

3. The developing device according to claim 1, wherein the sheet opening includes a recess disposed opposite the second developing side plate.

4. The developing device according to claim 1, further comprising a cushioning member interposed between the first developing side plate and the second developing side plate.

5. The developing device according to claim 4, wherein the cushioning member includes a urethan sheet.

6. The developing device according to claim 1, wherein the developer supplying rotator includes a first conveying screw including:

a rotation shaft; and a screw portion wound around the rotation shaft, and wherein the first conveying screw conveys the developer in an axial direction of the first conveying screw.

7. The developing device according to claim 6, further comprising:

a second conveying screw disposed below the first conveying screw;

a wall via which the second conveying screw is disposed opposite the first conveying screw; and a circulation path formed by the first conveying screw and the second conveying screw, the circulation path through which the developer circulates.

8. The developing device according to claim 7, further comprising:

a lower developing case supporting the first conveying screw and the second conveying screw rotatably, the lower developing case combined with the second developing side plate; and an upper developing case covering the developing roller, the upper developing case combined with the lower developing case.

9. The developing device according to claim 8, wherein the lower developing case includes a mount attached with the sheet member.

10. The developing device according to claim 8, further comprising a mount attached with the sheet member, the mount configured to be separated from the lower developing case.

11. The developing device according to claim 1, further comprising:

a first gear;

an idler gear meshing with the first gear; and a second gear meshing with the idler gear, wherein the developing roller includes a rotation shaft mounting the first gear, and wherein the developer supplying rotator includes a rotation shaft mounting the second gear.

12. The developing device according to claim 11, wherein on a cross section perpendicular to an axial direction of the rotation shaft of one of the developing roller and the developer supplying rotator, the sheet member is disposed in a space enclosed by the first gear, the second gear, and the idler gear.

13. The developing device according to claim 11, wherein an outer diameter of the idler gear is smaller than an outer diameter of each of the first gear and the second gear.

14. The developing device according to claim 1, wherein the sheet member includes a sheet made of a transparent resin material.

15. A process cartridge comprising:

an image bearer configured to bear a latent image; and a developing device combined with the image bearer into a unit, the developing device configured to contain a developer, the developing device comprising:

a developing roller configured to bear the developer and the developing roller including a magnet including a plurality of magnetic poles arranged in a circumferential direction of the magnet;

a developer supplying rotator disposed opposite the developing roller, the developer supplying rotator configured to rotate in a predetermined direction to supply the developer onto the developing roller;

a compartment accommodating the developer supplying rotator;

a first developing side plate including a through hole configured to position the magnet in the circumferential direction of the magnet;

a seal mounted on the first developing side plate;

a second developing side plate supporting the developer supplying rotator rotatably; and a sheet member configured to separate the developing roller from the developer supplying rotator, the sheet member configured to form an enclosed space that contains the developer in the compartment, the sheet member configured to be removed from the developing device, wherein the first developing side plate includes a sheet opening disposed opposite the second developing side plate, the sheet opening through which a part of the sheet member protrudes toward an outside of the developing device, wherein the magnet includes a non-rotatable shaft, wherein the non-rotatable shaft is disposed at a lateral end of the magnet and the non-rotatable shaft engaged the through hole, and wherein the seal is mounted on the sheet opening of the first developing side plate and the seal presses against the second developing side plate.

16. An image forming apparatus comprising:

an image bearer configured to bear a latent image; and a developing device configured to be removed from the image forming apparatus, the developing device configured to contain a developer, the developing device including:

a developing roller configured to develop the latent image formed on the image bearer with the developer and the developing roller including a magnet including a plurality of magnetic poles arranged in a circumferential direction of the magnet;

a developer supplying rotator disposed opposite the developing roller, the developer supplying rotator configured to rotate in a predetermined direction configured to supply the developer onto the developing roller;

a compartment accommodating the developer supplying rotator;

a first developing side plate including a through hole configured to position the magnet in the circumferential direction of the magnet;

a seal mounted on the first developing side plate;

a second developing side plate supporting the developer supplying rotator rotatably; and a sheet member configured to separate the developing roller from the developer supplying rotator, the sheet member configured to form an enclosed space that contains the developer in the compartment, the sheet member configured to be removed from the developing device, a seal mounted on the first developing side plate, wherein the first developing side plate includes a sheet opening disposed opposite the second developing side plate, the sheet opening through which a part of the sheet member protrudes toward an outside of the developing device, wherein the magnet includes a non-rotatable shaft, wherein the non-rotatable shaft is disposed at a lateral end of the magnet and is engaged the through hole, and wherein the seal is mounted on the sheet opening of the first developing side plate and the seal presses against the second developing side plate.

17. The developing device according to claim 1, wherein the first developing side plate has a bottom face and a side face, wherein the sheet opening is recessed from the bottom face, and wherein the side face includes the through hole.

* * * * *